United States Patent [19]

Lang

[11] 4,331,211

[45] May 25, 1982

[54] HYDRAULIC STEERING SYSTEM WITH REACTION TO THE ACTUATOR

[75] Inventor: Armin Lang, Schwabisch Gmund, Fed. Rep. of Germany

[73] Assignee: Zahnradfabrik Friedrichshafen, A.G., Friedrichshafen, Fed. Rep. of Germany

[21] Appl. No.: 94,541

[22] Filed: Nov. 15, 1979

[30] Foreign Application Priority Data

Nov. 30, 1978 [DE] Fed. Rep. of Germany ....... 2851773

[51] Int. Cl.³ ............................................. B62D 5/08
[52] U.S. Cl. ................................................... 180/141
[58] Field of Search ....................... 180/141, 142, 143

[56] References Cited

U.S. PATENT DOCUMENTS

| | | | |
|---|---|---|---|
| 3,690,400 | 9/1972 | Uchiyama | 180/142 |
| 3,744,515 | 7/1973 | Inoue | 180/143 |
| 3,833,081 | 9/1974 | Suzuki | 180/143 |
| 3,882,953 | 5/1975 | Maisch | 180/141 |
| 4,000,785 | 1/1977 | Nishikawa | 180/143 |
| 4,119,172 | 10/1978 | Yanagishima | 180/141 |

Primary Examiner—John A. Pekar
Attorney, Agent, or Firm—Zalkind & Shuster

[57] ABSTRACT

The manual force transmitted by a hand steering wheel to a fluid power steering mechanism is opposed by a reaction pressure that varies with the manual force at a proportionality factor of the operating pressure in the steering servomotor. The proportionality factor determining the reaction pressure is changeable under control of a reaction adjusting device.

2 Claims, 7 Drawing Figures

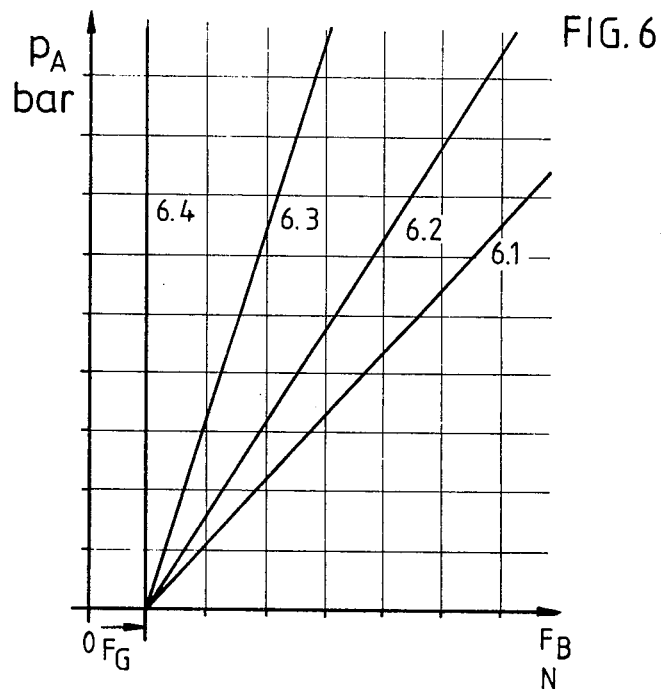
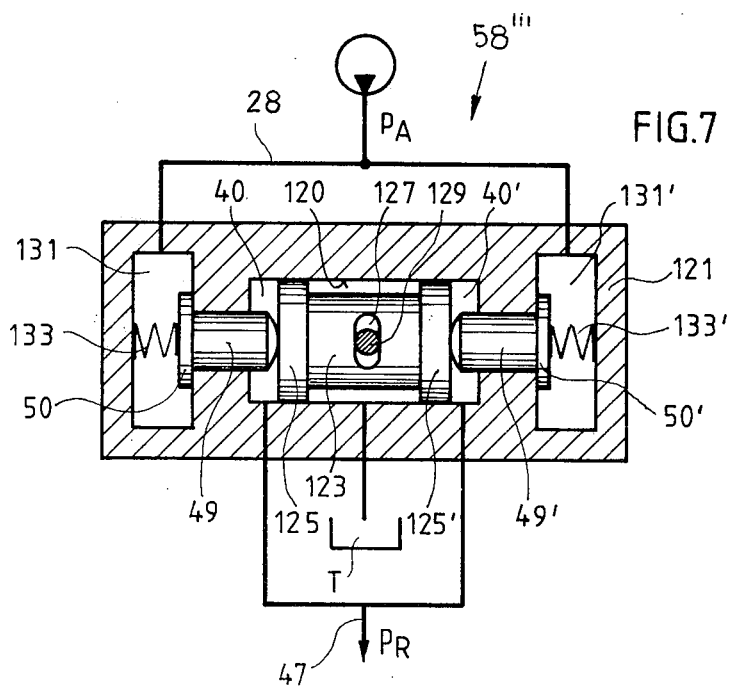

HYDRAULIC STEERING SYSTEM WITH REACTION TO THE ACTUATOR

BACKGROUND OF THE INVENTION

This invention relates to hydrosteering systems, for motor vehicles, of the type providing a reaction to manual forces applied to the hand steering wheel.

For successful steering operation, the driver of a vehicle must be familiar with the limitations imposed by frictional forces between the vehicle tires and the road during vehicle travel. Only then will the driver be able to correctly react by actuation of the hand steering wheel, the gas accelerator pedal and the brake pedal. Such corrective reaction of the driver results from a comparison of stimuli received from speed of travel, transverse and longitudinal accelerations of the vehicle, the force on the hand steering wheel and its rate of accleration. Based on experience with the gripping traction of the road (which is stored in a person's memory), the driver will actuate the hand steering wheel and the brake or gas pedal with some delay. This delay has a two-fold effect. First, the vehicle responds later than desired, after the introduction of an actuating maneuver by the driver, and second, the vehicle continues to respond longer than desired, as for example, after the hand steering wheel is returned to neutral position. Attempts have heretofore been made to minimize the effect of such delay by so-called lead steering systems. In a prior lead steering system, as described in "Transactions of the Society of Automotive Engineers of Japan, Inc.," issue No. 5, June 1973, by Hirao et al, a piston motor is inserted into the mechanical connection between the steering gear and the steered parts of the vehicle. The piston is held by compression springs in a middle position while the cylinder of the motor is connected to the steering gear and the piston to the steered parts of the vehicle. Pressurized fluid is fed through a special control valve to one or the other of the operating chambers of the piston motor in response to rotation of the steering spindle. A pump is arranged on the steering spindle as a sensing component which, depending on the direction of rotation, operates the control valve in such a manner that it continuously feeds pressurized fluid to that operating chamber of the motor effecting a steering movement in the desired direction. In this fashion, the delay in response of the steered parts of the vehicle is at least partially balanced. The elimination of undesirable delay in steering response, is achieved at the expense of interrupting the mechanical connection between the hand steering wheel and the steered parts of the motor vehicle so that the vehicle can no longer be steered in the event of hydraulic system failure.

It is therefore an important object of the present invention to provide a fluid powered steering system which will respond more rapidly to driver reactions to driving and steering conditions. An additional object, in accordance with the foregoing object, is to provide such a fluid powered steering system which avoids interrupting the mechanical connection between the actuating mechanism and the steered parts of the vehicle so that the vehicle remains steerable even in the event of hydraulic system failure.

SUMMARY OF THE INVENTION

In accordance with the present invention, a hydraulic steering system is provided for a motor vehicle having a transmission, a manual actuating mechanism, a steering servomotor connected to a high line, and a data input component for receiving input data which should influence the behavior of the driver. A reaction mechanism is operatively connected to the manual actuating mechanism for developing a reaction force opposing the manual forces transmitted by the actuating mechanism.

Further, in accordance with the invention, the reaction mechanism produces a reaction force that is controllable, unlike prior art arrangements, as disclosed, for example, in German Pat. No. OS 2351760, wherein the reaction force merely increases in proportion to the prevailing operating pressure. In such prior art arrangements, only the cutoff point for the reaction force is adjustable, after which the operating pressure rises abruptly in response to any further increase in manual force. The reaction mechanism of the present invention, on the other hand, produces a reaction force that varies in accordance with a proportionality factor that is changeable, the changeable proportionality factor being the ratio of operating pressure to manual force. The reaction mechanism is operated in such a way that it will always exert a reaction force on the manual operating mechanism so as to accommodate at least one condition. As a result, the driver will be able to more readily and rapidly perceive vehicle conditions in connection with the driver's steering reactions involving manual actuation of the steering wheel and application of the brake and gas pedals. More particularly, the driver will perceive or receive information regarding vehicle conditions more rapidly than any breakdown between the vehicle wheels and road traction. Thus, during rapid travel a higher reaction force is produced in order to enable the achievement of good straight-ahead driving stability. A lower reaction force is provided during slow travel along curved paths while even lower reaction or no reaction force at all is produced during parking maneuvers.

According to one embodiment of the invention, the reaction mechanism aforementioned includes adjustable control devices in the form of axially displaceable piston valves operatively connected to the manual actuating mechanism for displacement to a steering position against the opposing bias of two reaction pistons subjected to the reaction pressure of fluid that may vary between zero and a value proportional to the operating pressure in the steering servomotor. The piston valves form part of a steering control valve assembly on which the reaction pistons act providing for a relatively simple and efficient structural arrangement. The reaction pressure applied to the reaction pistons may be varied to change the aforementioned proportionality factor by including at least two adjustable flow restrictors interconnected in series between the high pressure line from the steering system pump and the return fluid reservoir, the flow restrictors being operated in opposite directions to produce a controllable reaction pressure therebetween fed to the reaction chambers associated with the aforementioned reaction pistons. By controlling the flow restrictors the reaction pressure may be adjusted digitally utilizing, for example, electromagnetic actuators. Thus, different combinations of opened and closed flow restrictors will provide different proportionality factors. In the foregoing type of reaction adjusting device, fluid losses cannot be avoided as long as there is an open flow restrictor. In accordance with another embodiment of the invention, a reaction adjusting device which also operates in a digital manner, does not require a continuous stream of fluid and therefore avoids energy losses.

BRIEF DESCRIPTION OF DRAWING FIGURES

Various embodiments of the invention are described hereinafter with reference to the accompanying drawings in which:

FIG. 6 is a graphical illustration showing operational characteristics for the embodiments of the reaction adjusting devices illustrated in FIGS. 3 through 5.

FIG. 7 is a combined simplified section view and schematic illustration showing another embodiment of a reaction mechanism from that shown in FIGS. 1 and 2.

DETAILED DESCRIPTION OF PREFERRED EMBODIMENTS

Figure 1:
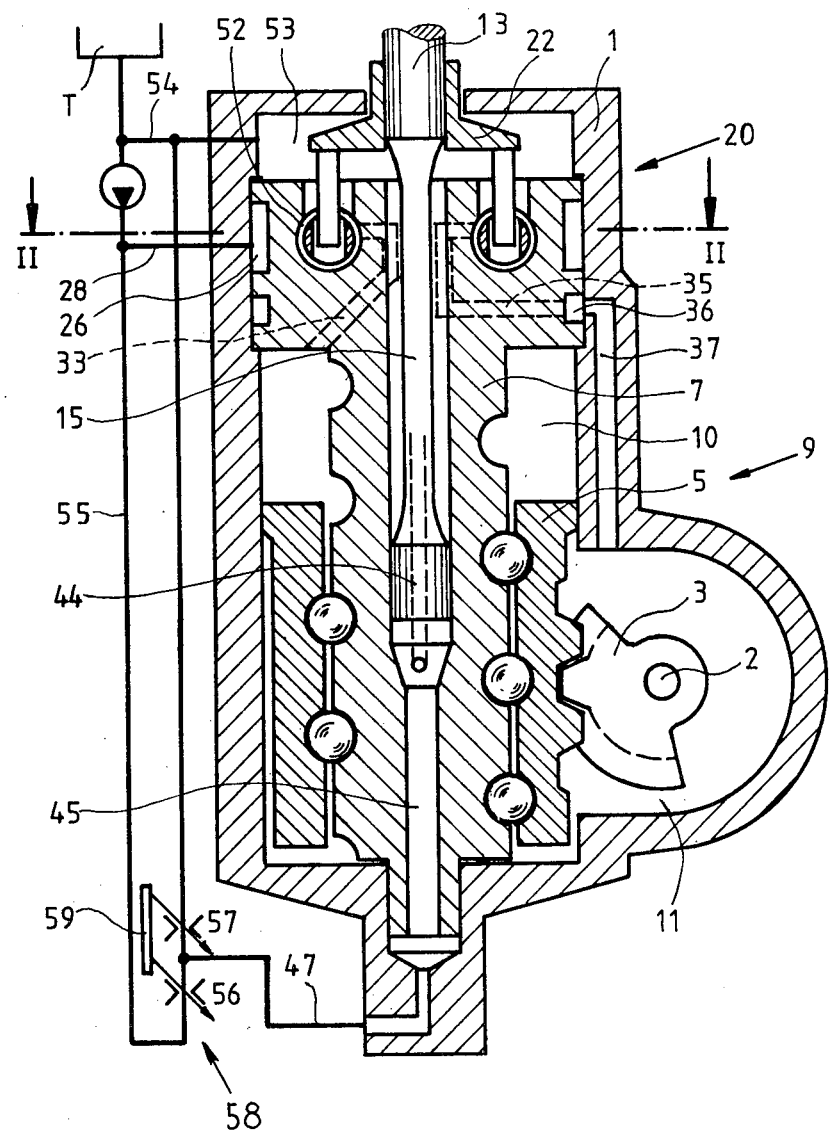
FIG. 1 is a longitudinal section through a ball nut type of hydrosteering mechanism associated with the present invention.
Figure 2:
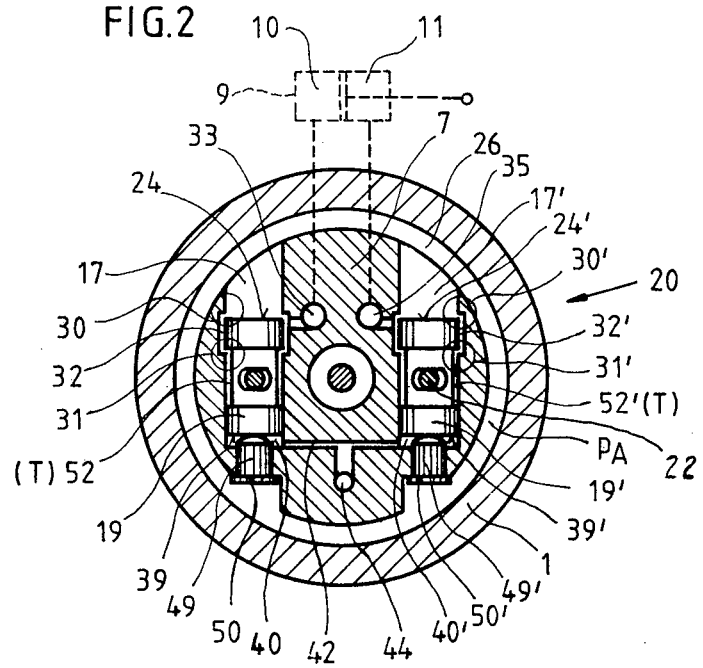
FIG. 2 is a transverse section view taken substantially through a plane indicated by section II—II in FIG. 1, in association with certain components shown symbolically.

Referring now to the drawings in detail, FIGS. 1 and 2 illustrate in a somewhat simplified form a hydrosteering mechanism which includes a housing 1 within which a sector gear shaft 2 is rotatably mounted for driving the steering linkages of an automotive vehicle. A segmental gear 3 torsionally connected to the shaft 2, meshes with rack teeth formed externally on an internally threaded ball nut 5. The nut 5 through ball elements engages screw threads on a spindle 7 rotatably mounted in axially fixed position within the housing. The ball nut constitutes the piston of a fluid steering servomotor 9 having pressure operating chambers 10 and 11 enclosed by the housing about the spindle 7. Gaskets and seals are appropriately installed in the housing, but are not shown in order to simplify the drawing.

A steering shaft 13 connected to an actuator, such as a hand steering wheel, is coupled to the spindle 7 by a torsion spring rod 15. A steering control valve assembly 20 is mounted in the body of spindle 7 and includes two valve pistons 19 and 19' axially displaceable within bores 17 and 17' transverse to the rotational axis of spindle 7. Both valve pistons are operatively interconnected with the shaft 13 by a driving fork 22 for displacement in opposite directional senses. Pressure actuating surfaces 24 and 24' at the upper ends of the valve pistons 19 and 19' as shown in FIG. 2, are exposed to pressurized fluid through an annular groove 26 in fluid communication with the bores 17 and 17'. The groove 26 is connected to a high pressure line 28 as shown in FIG. 1. FIG. 2, while showing a section through the steering valve 20, symbolically illustrates the steering motor 9 for easier understanding of the arrangement and operation. The two valve pistons control valve passages 30, 30' and 31, 31' through which the supply of pressurized fluid to the servomotor 9 and return flow from the motor to a return line is conducted. A steering motor control groove 32 in the bore 17 is connected by a passage 33 in the body of spindle 7 with the operating chamber 10, as shown in FIG. 2. A steering motor control groove 32' in the bore 17' is connected by a passage 35 in the body of the spindle 7, annular groove 36 and a passage 37 in the housing 1 with the operating chamber 11, as shown in FIG. 1. The lower ends of the two valve pistons 19 and 19' as shown in FIG. 2, have operating surfaces 39 and 39' exposed to fluid within two reaction chambers 40 and 40'. Both reaction chambers are interconnected by a passage 42 and a passage 44 in the body of spindle 7 with an axial passage 45 extending below the torsion spring rod 15 to the lower end of the body of spindle 7, as shown in FIG. 1. The passage 45 extends to a conduit coupling to a reaction line 47 which leads to a reaction pressure adjusting mechanism 58 to be described in detail hereinafter. Two reaction pistons 49 and 49' project into the reaction chambers and are provided with stop collars 50 and 50'. In a neutral position of the steering mechanism, the collars abut the body of spindle 7 at the ends of the bores receiving the reaction pistons. In said neutral position, the reaction pistons just about contact the operating surfaces 39 and 39' of the valve pistons. In all other steering positions, only one of the reaction pistons is active while the other is firmly held in an axial position with its stop collar in abutment with the spindle body.

In the neutral position as shown in FIGS. 1 and 2, determined by the torsion spring rod 15, operating fluid flows from the high pressure line 28 into the annular groove 26, through the valve passages of the opened valve pistons 19 and 19' and discharges through annular grooves 52 and a chamber 53 into the return line 54. The two grooves 32 and 32' of the steering valve 20, are under equal pressure. Therefore, the steering motor 9 is not driven. In one steering position of the valve 20, by way of example, the valve piston 19' as viewed in FIG. 2 is moved downwardly through the driving fork 22 while the valve piston 19 is moved upwardly. The valve passages 30 and 31' are thereby closed while the valve passages 31 and 30' remain open. Fluid under pressure therefore flows into the operating chamber 11 and return flow from the operating chamber 10 is conducted through the annular groove 52 into the return line 54. The piston of the servomotor constituted by the ball nut 5 is therefore displaced upwardly, as viewed in FIG. 1.

The same operating pressure $P_A$ acts upon the two operating surfaces 24 and 24' of both valve pistons building up in the servomotor. A reaction pressure acting on the opposing operating surfaces 39 and 39' of both valve pistons is developed in a manner to be described hereinafter. The reaction pressure is applied through reaction line 47 and the passages 45, 44 and 42 to the two reaction chambers 40 and 40' and varies between zero and the operating pressure $P_A$ acting on the surfaces 24 and 24'. Whenever the reaction pressure deviates from the operating pressure, then differential forces of equal magnitude will be exerted on both valve pistons resisted by the driving fork 22. The operating pressure prevailing in the annular groove 26 as shown in FIG. 2, acts on the lower ends of the two reaction pistons 49 and 49' while the reaction pressure prevailing in the reaction chambers acts on the upper ends of the reaction pistons. In one steering position, the left-hand valve piston 19 is lifted from its reaction piston 49. The right-hand reaction piston 49' then applies a force on its associated valve piston 19' because of the difference between the operating and reaction pressures multiplied by the effective surface of the reaction piston. This differential force exerts an influence on the steering shaft 13 through the valve piston 19' and the operating fork 22 in order to transmit a corrrespoding influence to the hand steering wheel.

Accordingly, a reaction force may be felt by the vehicle driver gripping the hand steering wheel.

When no adjustments are made in connection with changes in the reaction torque applied, a constant proportionality is maintained between the operating pressure $P_A$ effective on the steering motor and a manual force $F_b$ exerted by the driver on the hand steering wheel as represented, for example, by a straight line curve 6.1 in FIG. 6. The foregoing proportionality relationship between operating pressure $P_A$ and manual force $F_b$ is confined to a range having a lower manual limiting force $F_g$ corresponding to a predetermined torsional strain of the torsion spring rod 15. The proportionality factor is changed with changes in reaction pressure. Accordingly, it is possible to obtain reactions with other proportionality factors as illustrated by way of example in FIG. 6, showing other straight line proportionality curves 6.2 and 6.3.

One simple embodiment of the reaction adjusting mechanism 58 aforementioned, is symbolically illustrated in the lower left bottom portion of FIG. 1. The adjusting mechanism includes two adjustable flow restrictors 56 and 57 connected in series between the high pressure line 28 and return line 54 by a conduit 55. The two flow restrictors 56 and 57 are simultaneously adjustable in opposite directions by a common operator 59 to which they are mechanically interconnected. Thus, while one of the adjusting restrictors is opened, the other is closed. A fluid tap between the two adjustable flow restrictors is connected to the reaction line 47.

Assuming that the flow restrictor 57 is fully opened and the flow restrictor 56 is fully closed, the same pressure prevailing in the return line 54 will prevail in both reaction chambers. Accordingly, the full operating pressure in line 28 will act on the reaction pistons and the largest possible reaction will be exerted as graphically illustrated by the straight line curve 6.1 in FIG. 6. If, however, the adjustable flow restrictors are adjusted in the opposite direction with the restrictor 57 closed and the restrictor 56 open, then the full operating pressure in line 28 will be applied through reaction line 47 to both reaction chambers 40 and 40'. The reaction pistons 49 and 49' will then be rendered ineffective so that no reaction to steering operation is developed, as graphically depicted by the vertical straight line curve 6.4 in FIG. 6. When both adjustable flow restrictors 56 and 57 are opened by equal amounts, then the reaction pressure substantially equal to half the operating pressure, will be applied to the reaction line 47. The reaction force then developed will lie between the two extremes depicted by curves 6.1 and 6.4 in FIG. 6 denoted by straight line curves 6.2 and 6.3 by way of example. Thus, by adjustment of the flow restrictors 56 and 57, one may change the proportional relationship between the operating pressure and the reaction force developed, corresponding to many different characteristic straight line curves between the extremes depicted by curves 6.1 and 6.4 in FIG. 6.

Figure 3:
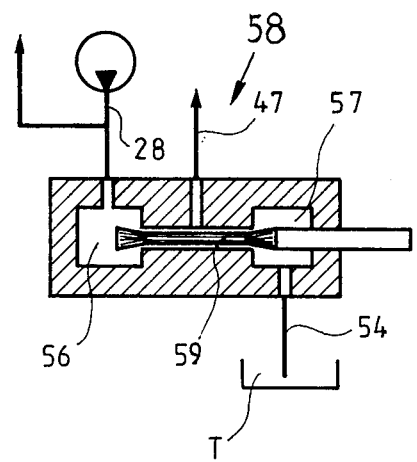
FIGS. 3 through 5 are simplified section views and schematic illustrations showing three different embodiments of reaction adjusting devices utilized in the present invention.

One practical embodiment of a reaction adjusting mechanism 58 is shown in greater detail in FIG. 3, operating in a manner hereinbefore described with respect to FIG. 1. The restrictor control operator 59 may be actuated manually or automatically through a vehicle speedometer, for example, in order to develop a reaction force that increases with increasing speed of travel. Other types of reaction adjusting mechanism 58' and 58" are respectively illustrated in FIGS. 4 and 5 in order to enable operation under control of digital signals developed, for example, by a data processing computer.

Figure 4:
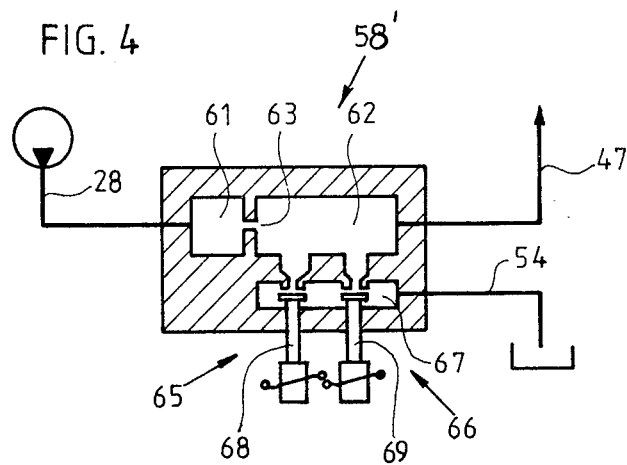

As shown in FIG. 4, the high pressure line 28 and the reservoir return line 54 are respectively connected to chambers 61 and 67 in the reaction adjusting mechanism 58'. A constant flow restrictor 63 is located between the chambers 61 and 62, the chamber 62 being connected to the chamber 67 through two controllable flow restrictors 65 and 66 arranged in parallel with each other. The chamber 62 is connected to the reaction line 47. The two controllable flow restrictors 65 and 66 are respectively provided with flow blocking elements 68 and 69 which may be actuated mechnically, for example, or electromagnetically as shown in FIG. 4. While the flow areas of the two controllable flow restrictors 65 and 66 may be equal in size, they are preferably of different sizes as shown. Thus, four different step flow adjustments may be effected through the two controllable flow restrictors as a result of the flow restrictors being either both opened or both closed, only one open and only the other open. If a third controllable flow restrictor is provided, eight step adjustments may be effected while the provision of four flow restrictors will product 16 possible adjustments and so on. The number of controllable flow restrictors utilized will determine the number of flow adjustments possible by the power of two. When only two controllable flow restrictors are utilized as shown in FIG. 4, by proper selection of the flow area size for the fixed restrictor 63, 4 different reaction pressures may be developed consisting of 0, 33%, 50% and 75% of the full operating pressure corresponding to the straight line curves shown in FIG. 6. In this type of reaction adjusting mechanism, flow losses will always occur as long as one of the controllable flow restrictors is open. Flow losses may, however, be maintained very small by utilizing small restrictive flow areas.

Figure 5:
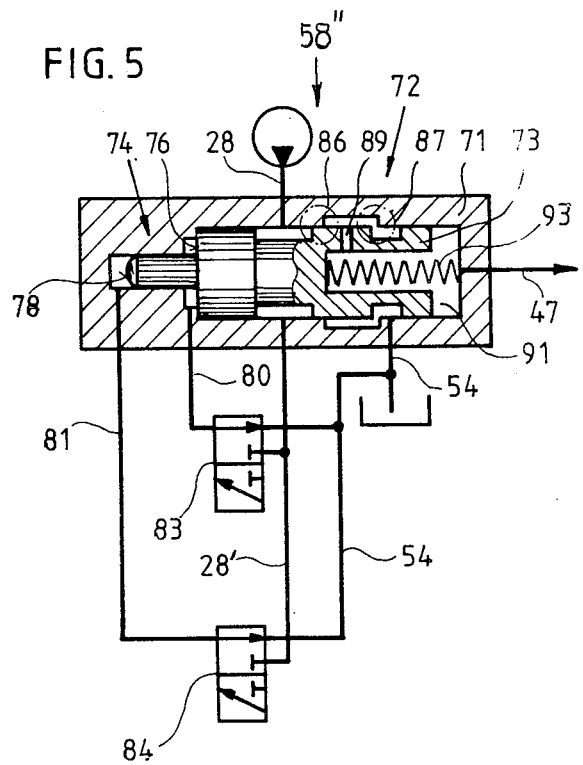

The reaction adjusting mechanism 58" shown in FIG. 5 will minimize or eliminate the flow losses hereinbefore referred to in connection with FIG. 4. The mechanism 58" includes valve piston 73 having a small diameter piston portion 74 within housing 71. Two operating surfaces, 76 and 78 are formed on the piston 73 at the left end as viewed in FIG. 5 exposed to the pressurized fluid within chambers to which conduits 80 and 81 are connected. The flow of fluid through conduits 80 and 81 are controlled by two control valves 83 and 84. In the positions shown, the valves 83 and 84 connect the operating chambers for surfaces 76 and 78 to the return line 54. In the other positions of the valves 83 and 84, the operating chambers are connected through line 28' to the high pressure line 28.

The valve piston 73 also controls two pairs of valve passages 86 and 87 in communicating through a radial passage 89 in the piston with a spring chamber 91 within which a valve spring 93 is located. The reaction line 47 is connected to the spring chamber 91 as shown. By means of the two control valves 83 and 84, four different control combinations are possible wherein (1) both operating surfaces 76 and 78 are connected to the high pressure line 28, (2) are connected to the return line 54, (3) the operating surface 78 is exposed to the high pressure in line 28 while surfaces 76 is exposed to the pressure in return line, and (4) operating surface 78 is exposed to the pressure in the return line while surface 76 is exposed to the high pressure in line 28. The reservoir pressure in line 54 prevails within the spring chamber 91 in the position of piston 73 as shown in FIG. 5, and therefore also in the reaction line 47. If one of the operating surfaces 76 and 78 is acted upon by the operating pressure, then the mechanism 58" begins to function by the valve piston 73 being displaced in a right-hand direction from the position shown in FIG. 5 so that valve passage 87 closes and the valve passage 86 opens sufficiently until an equillibrium condition is achieved by the force resulting from the operating pressure multiplied by the operating surface exposed to the high pressure line 28. This force is balanced out by two forces acting on the right-hand end of the valve piston, namely the force of the valve spring 93 and the pressure force determined by the right-hand piston surface multiplied by the reaction pressure developed. Four different adjustable reaction pressures may be obtained, including the zero reaction pressure, by appropriate adjustment of mechanism 58" corresponding to the straight line proportionally characteristics depicted in FIG. 6. When the reaction pressure has the same value as the operating pressure, this characteristic corresponds to straight line curve 64 in FIG. 6 and there is no reaction. When the reaction pressure is zero, this is depicted by the straight line curve 6.1 in FIG. 6 providing the greatest possible reaction. The two other valve control possibilities associated with mechanism 58" will correspond to the straight line curves 6.2 and 6.3 in FIG. 6. If the valve piston 73 is provided with additional diameter steps, and if a control valve in addition to the control valves 83 and 84 is added, then one will be able to obtain additional control conditions and thus additional intermediate values of reaction pressure.

The reaction adjusting arrangements described with respect to FIGS. 4 and 5, make possible digital control of reaction pressure. For example, down-shift changeover in drive ratio for a motor vehicle sensed by micro switches may be effective to control operation of the flow restrictors or control valves in such manner as to obtain a zero reaction for first and reverse speeds, the highest reaction for the highest speed and corresponding reaction pressures for intermediate speeds. As soon as the reaction pressure is developed as a proportion of the prevailing operating pressure, the driver will sense the resistance developed at the hand wheel and become aware of any sudden change in resistance so as to alter his behavior accordingly. The reaction adjusting device 58' as shown in FIG. 4 enables use of a purely mechanical operation. When utilized for a change speed gear, the flow restrictor closing elements 68 and 69 shown in FIG. 4 may be operated mechanically. Similarly, the control valves 83 and 84 associated with the mechanism 58" shown in FIG. 5 may be operated mechanically whenever fluid lines 80, 81, 28' and 54 are controlled through the adjusting device by input data.

It is not absolutely necessary that the reaction mechanism be positively connected to the manual actuator or that two reaction pistons or two valve pistons be provided. All valve pistons could be united into a single assembly without any functional change, particularly since hydraulic steering control valves formed by a single valve piston are already well known. Further, the reaction pistons may also act upon another component having no valve function as shown by reaction adjusting mechanism 58''' in FIG. 7. The mechanism 58''' includes a piston 123 axially displaceable within a bore 120 of a housing 121. The piston 123 has an elongated hole 127 at its center within which a pin 129 is engaged to establish a mechanical connection to a steering control spindle similar to one-half of the driving fork 22 shown in FIG. 1. Two collars 125 and 125' are secured to the opposite axial ends of the piston 123 in order to form a fluid seal for an annular space within the bore 120 isolating the reservoir pressure in communication therewith. The reaction chambers 40 and 40' are formed at opposite ends of the bore 120 into which the two reaction pistons 49 and 49' project. The reaction pistons are provided with stop collars 50 and 50' as in the case of FIG. 2. The two reaction pistons are biased by compression springs 133 and 133' into engagement with the opposite ends of the piston 123. The two reaction chambers 40 and 40' are connected to the reaction line 47 within which the reaction pressure $P_R$ prevails. Two chambers 131 and 131' within which the stop collars are located, are connected to the high pressure line 28 within which the operating pressure $P_A$ prevails. The reaction adjusting mechanism 58''' as illustrated in FIG. 7 develops a reaction force which is a direct function of the reaction pressure produced. The apparatus of FIG. 7 merely changes the reaction force, but does not otherwise interfere with the hydraulic and mechanical functioning of the steering mechanism. This has the advantage that the vehicle will remain steerable even if the reaction adjusting mechanism should fail.

What is claimed is:

1. A hydraulic steering system for a motor vehicle, including a steering actuator (97), a steering servomotor (9), a source (28) of operating pressure connected to the servomotor, input means (103) for producing control signals influenced by at least one steering and driving condition, a reaction mechanism (19, 19', 23) operatively connected to the actuator for developing a reaction force opposing manual forces transmitted to the actuator, and reaction adjusting means (58, 58', 58", 99) operatively connected to the input means and the reaction mechanism for controlling the reaction force as a function of said control signals, said reaction adjusting means (58) including two adjustable flow restrictors (56, 57), a conduit (55) conducting flow through the adjustable flow restrictors in series between the source of operating pressure and a return line (54), operating means (59) connected to said adjustable flow restrictors for simultaneous variation of said flow therethrough in opposite directions, and a reaction line (47) connecting the reaction mechanism to said conduit between the two flow restrictors.

2. A hydraulic steering system for a motor vehicle, including a steering actuator (97), a steering servomotor (9), a source (28) of operating pressure connected to the servomotor, input means for producing a control signal influenced by at least one steering and driving condition condition, a reaction mechanism (19, 19', 123) operatively connected to the actuator for developing a reaction force opposing manual forces transmitted to the actuator, and reaction adjusting means (58, 58', 58", 99) operatively connected to the input means and the reaction mechanism for controlling the reaction force as a function of said control signal, said reaction mechanism including at least one adjustable control device operatively connected to the actuator for displacement to a steering position, and two reaction pistons (49, 49') at least one of which exerts the reaction force on the control device in said steering position, said reaction force varying between zero and a value proportional to the operating pressure in the steering servomotor in response to a controllable pressure ($P_R$) acting on one of the reaction pistons, said control device including a valve piston (19, 19′) in driving connection with the actuator, the two reaction pistons being exposed to differential pressure which equals the difference between the operating pressure effective in the steering servomotor and the controllable reaction pressure, the reaction pistons having operating surfaces exposed to fluid in reaction chambers (40, 40′) and a reaction line (47) connecting said reaction adjusting means to the reaction chambers for adjustment of the reaction pressure, the reaction adjusting means including a pressure responsive piston (72) having a stepped diameter portion (74), a housing within which the piston is displaceable, and a valve spring (93) enclosed by the housing within a spring chamber (91), said stepped diameter portion of the piston having operating surfaces (76, 78) operating chambers applying pressure to said surfaces opposing the bias of said valve spring, and a control valve (83, 84) connecting the operating chambers to the high pressure line or the return line, the reaction line being connected to the spring chamber.

* * * * *